United States Patent
Patnaik

(10) Patent No.: US 12,229,579 B2
(45) Date of Patent: Feb. 18, 2025

(54) EXECUTION REDIRECTION IN A REMOTE DESKTOP

(71) Applicant: Microsoft Technology Licensing, LLC, Redmond, WA (US)

(72) Inventor: Sandeep Patnaik, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 383 days.

(21) Appl. No.: 17/675,855

(22) Filed: Feb. 18, 2022

(65) Prior Publication Data
US 2023/0266985 A1    Aug. 24, 2023

(51) Int. Cl.
| | |
|---|---|
| G06F 9/44 | (2018.01) |
| G06F 9/451 | (2018.01) |
| G06F 9/455 | (2018.01) |
| H04L 67/01 | (2022.01) |
| H04L 67/02 | (2022.01) |

(52) U.S. Cl.
CPC .......... *G06F 9/45558* (2013.01); *G06F 9/452* (2018.02); *H04L 67/01* (2022.05); *H04L 67/02* (2013.01); *G06F 2009/45595* (2013.01)

(58) Field of Classification Search
CPC .................................................. G06F 9/45558
USPC .......................................................... 718/1
See application file for complete search history.

(56) References Cited

U.S. PATENT DOCUMENTS

| | | |
|---|---|---|
| 9,054,865 B2 | 6/2015 | Gan |
| 2007/0061477 A1 | 3/2007 | Stoyanov et al. |
| 2021/0152626 A1* | 5/2021 | Momchilov .......... G06F 3/1454 |

OTHER PUBLICATIONS

".Net: How to run a local application via a remote desktop application", Retrieved from: https://web.archive.org/web/20170404044429/https://stackoverflow.com/questions/9735720/net-how-to-run-a-local-application-via-a-remote-desktop-application, Apr. 4, 2017, 2 Pages.
"Host to client redirection", Retrieved from: https://docs.citrix.com/en-us/citrix-virtual-apps-desktops/general-content-redirection/host-to-client-redirection.html, Jul. 20, 2021, 4 Pages.
"Local App Access and URL redirection", Retrieved from: https://docs.citrix.com/en-us/xenapp-and-xendesktop/7-15- ltsr/general-content-redirection/laa-url-redirect.html, Oct. 21, 2020, 7 Pages.

(Continued)

*Primary Examiner* — Timothy A Mudrick
(74) *Attorney, Agent, or Firm* — Schwegman Lundberg & Woessner, P.A.

(57) ABSTRACT

Methods, systems, and computer programs are presented for redirecting executing of a virtual machine (VM) program to a client device. One method is performed by a server executing the VM. The method includes an operation for receiving an input from a remote desktop application of a client device to execute a program at the VM, and for checking redirect logic to determine execution of the program on the client device. The redirect logic comprises at least one rule to redirect execution of the program to the client device instead of executing the program at the VM. Further, the method includes an operation for, based on determining to execute the program on the client device, send to the client device a request for executing the program at the client device. The client device is configured to execute the program in response to the request.

20 Claims, 9 Drawing Sheets

(56) References Cited

OTHER PUBLICATIONS

"Redirect URLs for Native Apps", Retrieved from: https://web.archive.org/web/20211231060015/https://www.oauth.com/oauth2-servers/redirect-uris/redirect-uris-native-apps/, Dec. 31, 2021, 4 Pages.

"Shell.ShellExecute method", Retrieved from: https://docs.microsoft.com/en-US/windows/win32/shell/shell-shellexecute, Apr. 28, 2021, 5 Pages.

"ShellExecute leaks handles", Retrieved from: https://social.msdn.microsoft.com/Forums/azure/en-US/33bade27-ad82-49a7-b9fa-f8eb55803470/shellexecute-leaks-handles, Retrieved Date: Oct. 25, 2021, 2021, 7 Pages.

"Thread: Redirecting output from ShellExecute", Retrieved from: https://forums.codeguru.com/showthread.php?363278-Redirecting-output-from-ShellExecute, Nov. 2, 2005, 6 pages.

"Understanding ShellExecute function and it's application to open a list of URLs present in a file using C++ code", Retrieved from: https://web.archive.org/web/20211101014537/https://www.geeksforgeeks.org/understanding-shellexecute-function-application-open-list-urls-present-file-using-c-code/, Nov. 1, 2021, 8 Pages.

"Using redirection in Azure RemoteApp", Retrieved from: https://remoteapp.readthedocs.io/en/stable/remoteapp-redirection/, Retrieved Date: Oct. 18, 2021, 5 Pages.

"Wow64DisableWow64FsRedirection function (wow64apiset.h)", Retrieved from: https://docs.microsoft.com/en-us/windows/win32/api/wow64apiset/nf-wow64apiset-wow64disablewow64fsredirection, Oct. 13, 2021, 5 Pages.

Coulter, et al., "Launching Applications (ShellExecute, ShellExecuteEx, Shellexecuteinfo)", Retrieved from: https://docs.microsoft.com/en-us/windows/win32/shell/launch, Jul. 8, 2021, 6 pages.

Elharrouss, et al., "Image Inpainting: A Review", In Journal of Neural Processing Letters vol. 51, Dec. 6, 2019, 21 Pages.

Hardt, et al., "The OAuth 2.0 Authorization Framework", Retrieved from << https://tools.ietf.org/html/rfc6749 >>, Oct. 13, 2012, 76 Pages.

Lohr, et al., "Configure device redirections", Retrieved from: https://docs.microsoft.com/en-us/azure/virtual-desktop/configure-device-redirections, Jun. 8, 2021, 4 Pages.

Radich, et al., "File System Redirector", Retrieved from: https://docs.microsoft.com/en-us/windows/win32/winprog64/file-system-redirector, Jun. 4, 2021, 3 Pages.

"International Search Report and Written Opinion Issued in PCT Application No. PCT/US22/050983", Mailed Date: Mar. 14, 2023, 11 Pages.

* cited by examiner

EXECUTION REDIRECTION IN A REMOTE DESKTOP

CROSS-REFERENCE TO RELATED APPLICATIONS

This application is related by subject matter to U.S. patent application Ser. No. 17/675,881, filed Feb. 18, 2022 and entitled "Direct Loading of Client Cloud Files in a Remote Desktop," which is incorporated herein by reference in its entirety.

TECHNICAL FIELD

The subject matter disclosed herein generally relates to methods, systems, and machine-readable storage media for managing the execution of programs in a remote-desktop environment.

BACKGROUND

Virtual machines (VMs) are an excellent tool for providing inexpensive computing capabilities. Unfortunately, there are several classes of applications that do not work will in virtualized environments, such as real-time communications applications, media-display applications, web-media presentations, graphically intensive applications (e.g., CAD, design tools, games), applications that transmit a large amount of data between the server and the client endpoint (e.g., file compression), etc.

These applications result in poor user experiences and high computer-resource usage.

BRIEF DESCRIPTION OF HE DRAWINGS

Various of the appended drawings merely illustrate example embodiments of the present disclosure and cannot be considered as limiting its scope.

DETAILED DESCRIPTION

Figure 1:
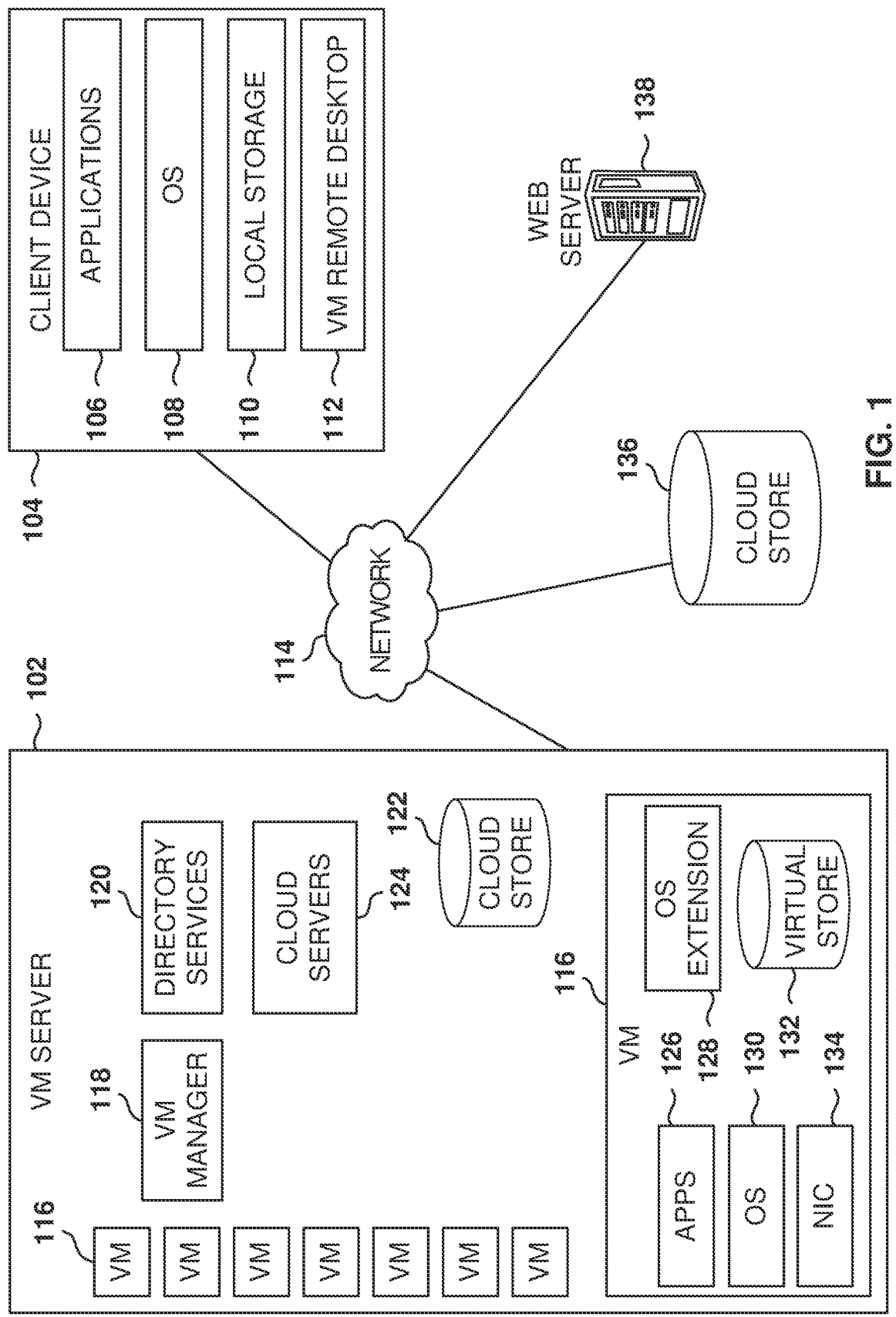
FIG. 1 is a simplified diagram of a computer environment for deployment of virtual machines (VMs), according to some example embodiments.

Example methods, systems, and computer programs are directed to redirecting executing of a VM program to a client device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, an application-launch request on a VM desktop operating system (OS) is redirected to a client device OS to execute the application on the client device instead of on the VM. In one example, the VM OS intercepts a request to launch the application, determines that the request includes a Uniform Resource Identifier (URI), determines that the URI satisfies an execution-redirect policy, and then sends the URI and a launch instruction to the local client device so the application is launched locally on the client device instead of executing on the VM.

The execution redirection provides several benefits, such as reduce network utilization (e.g., by avoiding the transfer of large amount of data between the VM, and the local client device), free resources for the VM service provider, improve delivery of video on the display, etc. Additionally, the execution redirection is more efficient and broadly applicable than redirection with a remote virtual browser plugin or a remote virtual separate redirector application, which may not exist with some browsers, and may depend on particular protocols.

One general aspect includes a method performed by a server executing a virtual machine (VM). The method includes operations for receiving an input from a remote desktop application of a client device to execute a program at the VM, and for checking redirect logic to determine execution of the program on the client device. The redirect logic comprises at least one rule to redirect execution of the program to the client device instead of executing the program at the VM. Further, the method includes an operation for, based on determining to execute the program on the client device, send to the client device a request for executing the program at the client device. The client device is configured to execute the program in response to the request.

One general aspect includes a method performed by a remote desktop application executing on a client device. The includes operations for receiving an input to execute a program at a virtual machine (VM) associated with the remote desktop application, and for checking redirect logic to determine execution of the program on the client device. The redirect logic comprises at least one rule to redirect execution of the program to the client device instead of executing the program at the VM. Further, the method includes an operation for, based on determining to execute the program on the client device, requesting execution of the program at the client device.

FIG. 1 is a simplified diagram of a computer environment for deployment of virtual machines (VMs), according to some example embodiments. A cloud-service server 102 provides multiple services, including the deployment of a plurality of VMs 116. Although a single cloud-service server 102 is presented, the services may be provided by a plurality of servers cooperating in a distributed fashion.

One example of a VM provider is Azure™ from Microsoft™ to provision Windows™ or Linux™ VMs. Some of the embodiments are presented with reference to Azure, but the same principles may be used for other VM services.

A client device 104 may be used to access the cloud-service server 102 via a network 114 such as the Internet. The client device 104 includes an operating system (OS) 108 to enable executing applications 106 on the client device 104. If the client device 104 provisions a VM 116 on the cloud-service server 102, the VM 116 may be accessed through terminal services, including a VM remote-desktop window 112 that presents the user interface that the VM machine 116 provides. The client device 104 further includes local storage 110.

Terminal Services, also known as Remote Desktop Services in Windows Server, is a component of Microsoft Windows that allows a user to access applications and data on a remote computer over a network. Windows applications, or the entire desktop of the computer running Terminal Services, are made accessible to a remote client device 104, such as at VM remote-desktop window 112. With Terminal Services, the user interface of an application is presented at the client. Any input to it is redirected over the network to the server, where application execution takes place.

The cloud-service server 102 further includes a VM manager 118, directory services 120, one or more cloud servers 124, and cloud store 122. The VM manager is responsible for configuring, provisioning, managing, monitoring, and de-provisioning the VMs 116. Directory services 120 implement the Azure Active Directory (Azure AD) enterprise identity service that provides user management, single sign-on, multi-factor authentication, and other directory-related services.

One or more cloud servers 124 provide the computing resources for implementing the services of the cloud service. Further, cloud store 122 allows users to store data on the cloud. The data in the cloud store 122 may also be configured to be accessed by the VMs 116.

Additionally, the client device 104 may access other cloud storage 136 provided by a different entity than the cloud service provider. Further, the client device 104 and the VMs 116 may access other servers 138 (e.g., web server) via the network 114.

A VMs 116 includes an OS 130, executing applications 126, an OS extension 128 that implements remote-desktop features, a network interface card (NIC) 134 to communicate via a virtual network, and virtual store 132 for storing the data of the VM 116. In some embodiments, all or some of the OS extension 128 features are integrated within the OS 130.

Users execute many types of applications on their local machines (e.g., personal computers, laptops, tablets) and are used to certain performance levels. However, when users run applications on the VM 16, the response may not be as good as in their local clients for many reasons, such as the need to transfer large amounts of data over the network, low network bandwidth available, etc.

Additionally, an IT department of a company may set security policies for the VMs, such as disabling access to certain websites or certain applications. For example. IT may have disabled access to YouTube.com. However, YouTube™ is used by many users as an educational or a marketing tool, so disabling access will be frustrating for many users.

Figure 2:
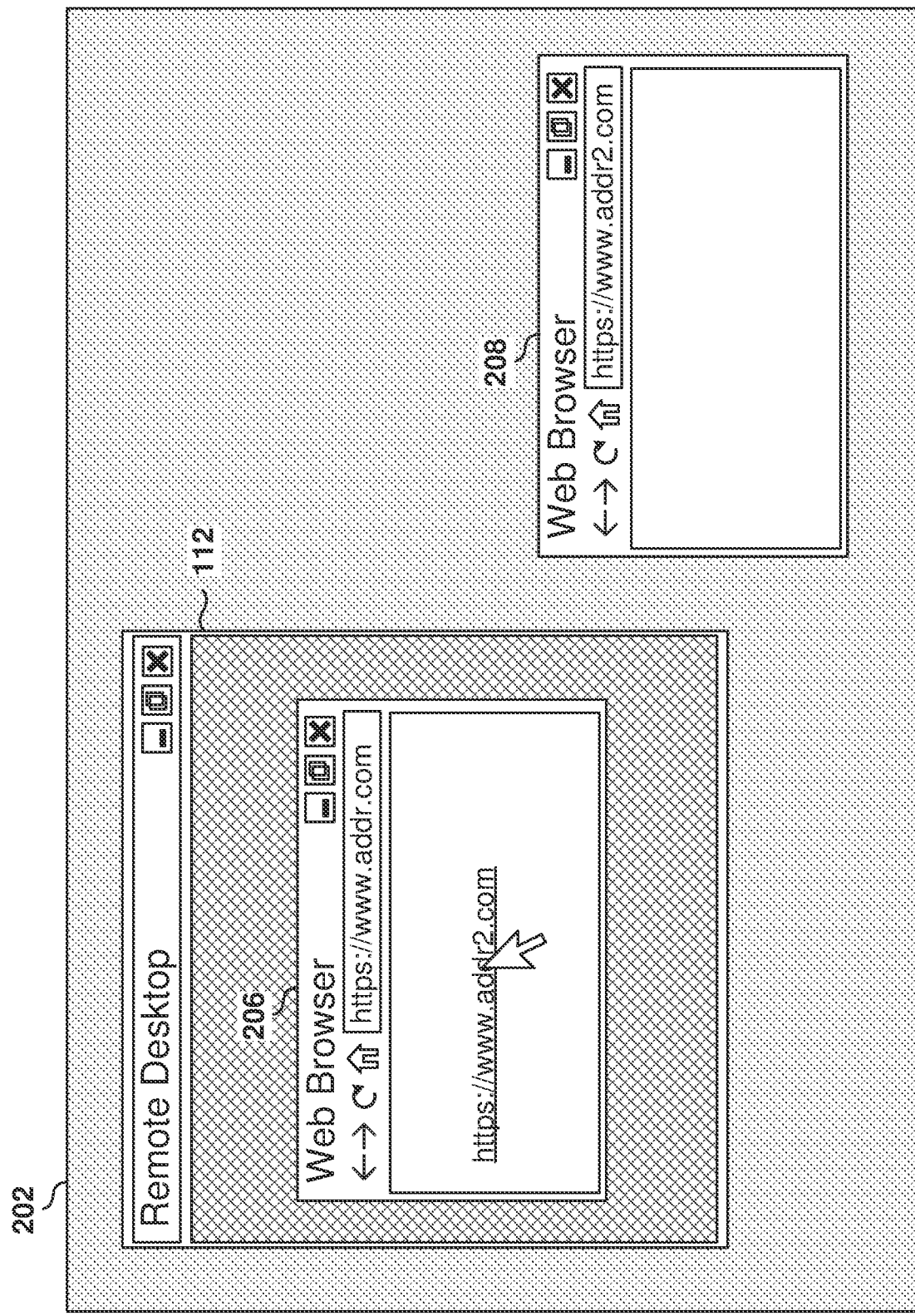
FIG. 2 is a user interface showing execution redirection to the local client device, according to some example embodiments.

FIG. 2 is a user interface (UI) 202 showing the execution redirection to the local client device, according to some example embodiments. The UI 202 corresponds to the desktop view of the client device 104.

In some embodiments, the VM service provides an option to configure applications for execution redirection to be executed in the local client device instead of being executed on the VM. The administrator of the VM service configures what to redirect to the local client device. As used herein, redirect refers to changing execution of a program that was triggered to be executed on the VM to be executed on the client device instead.

For example, the administrator may choose to allow word processors and email clients to execute on the VM while executing web browsers on the client, or allow the web browsers to execute on the VM except for a predefined set of web addresses that will be opened on a web browser of the local client device.

In the illustrated example, the UI 202 includes the VM remote-desktop window 112 tier interfacing with the remote VM. In this example, the VM remote-desktop window 112 includes a web-browser window 206 currently showing a webpage at a certain web address https://www.addr.com.

Within the web page https://www.addr.com, a link to another address https://www.addr2.com is selected by the user. According to configurable redirect logic, described in more detail below, the address https://www.addr2.com is configured to be executed on the local client device. Thus, after the user selection received as an input, an instruction is sent to the client device, which opens web browser window 208 at the selected address https://www.addr2.com.

In some example embodiments, after the web browser window 208 is opened on the local client device, the VM has no further control on the window that just opened on the client device.

Although some embodiments are presented with reference to a web browser, the same principles may be applied to other applications. For example, a phone application may detect an input to call a phone number, and the redirection will cause a phone application to be opened on the local client device to call that phone number. The embodiments illustrated in FIG. 2 should therefore not be interpreted to be exclusive or limiting, but rather illustrative.

Figure 3:
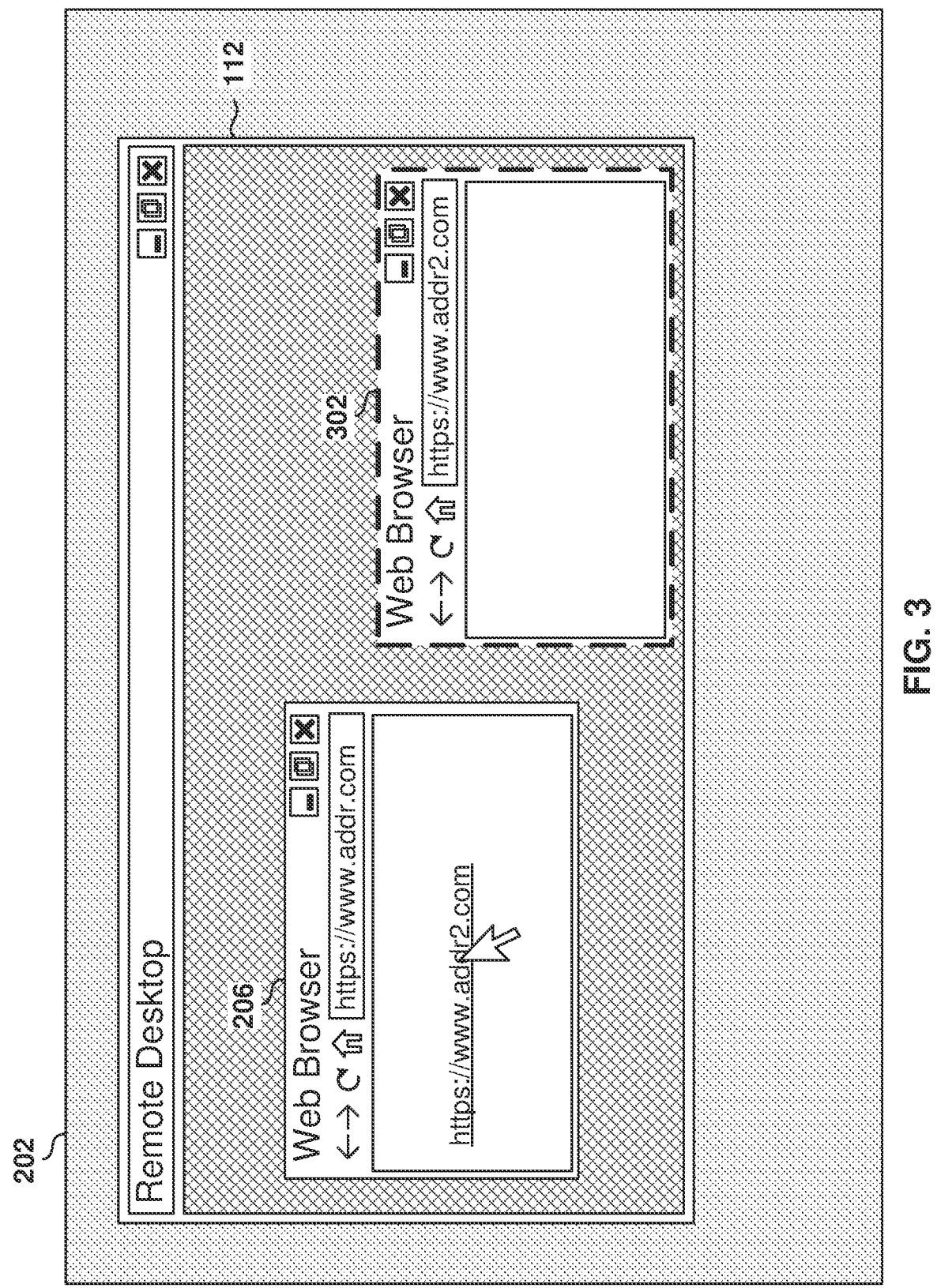
FIG. 3 is a user interface with an embedded client-executed window within the remote desktop window, according to some example embodiments.

FIG. 3 is a UI 202 with an embedded client-executed window within the VM remote-desktop window 112, according to some example embodiments.

In some embodiments, the process is similar to the process described above with reference to FIG. 2, except that the web browser window 302, executing on the local client, is integrated within the VM remote-desktop window 112.

This means that, to the user, it appears that the web browser is executing on the VM, but in reality, the web browser is executing on the client device and superimposed on the VM remote-desktop window 112. In general, all the content on the VM remote-desktop window 112 is controlled by the VM, e.g., the VM determines all the pixels that are presented on the VM remote-desktop window 112. But in this scenario, the local OS "stitches" the web browser window 302 on top of the VM remote-desktop window 112 to give the appearance that the web browser is executing on the VM.

In some embodiments, the user is not notified of the "stitching," but in other embodiments, the web browser window 302 may include an indicator that is being executed on the local client device, such as a border with a different color, a banner over imposed with a message indicating local execution, etc.

The advantage of the stitching approach is that the UI behaves as the user would expect it, instead of having a window created on the local machine after the user interacts with the VM.

Figure 4:
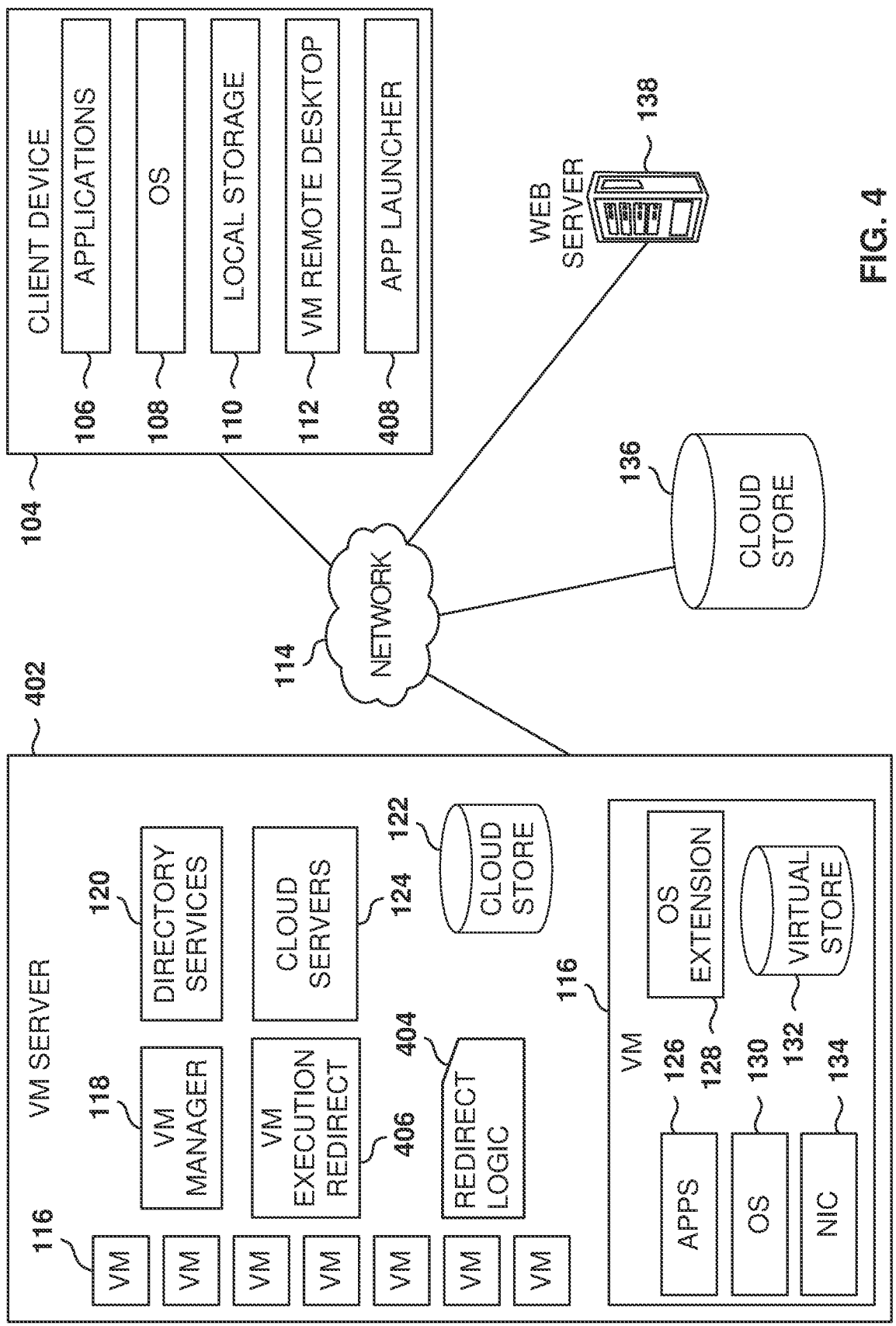
FIG. 4 is a diagram of a computer environment with programmable logic for redirecting execution of a program from a VM to a client device, according to some example embodiments.

FIG. 4 is a diagram of a computer environment with programmable logic for redirecting execution of a program from a VM 116 to a client device 104, according to some example embodiments. The cloud-service server 402 includes the same modules as the cloud-service server 102 described with reference to FIG. 1, plus a VM execution redirect module 406 that uses redirect logic 404 for determining when programs are redirected for execution to the client device 104.

The VM execution redirect module 406 may be a stand-alone program or be integrated with another program, such as the VM manager 118. The VM execution redirect module 406 monitors the activity on the VM to determine when to redirect execution of a program to the client device 104.

The redirect logic 404 is a set of rules that determine when to redirect execution. The rules may include rules for redirecting an application (based on an executable file invoked), redirecting access to a URI, rules for redirecting access located in a defined network location or on the local storage of the client device, etc. In some embodiments, the URI is a Uniform Resource Locator (URL). More details regarding redirect logic 404 are provided below with reference to FIG. 6.

The execution redirection provides several benefits, such as reduce network utilization (e.g., by avoiding the transfer of large amount of data between the VM, and the local client device), free resources for the VM service provider, improve delivery of video on the display, etc.

The client device 204 includes the same elements as the client device 104 of FIG. 1 plus an app launcher module 408. The app launcher module 408 interfaces with the OS 108 to request execution of one or more applications 106 on the client device. In some example embodiments, the app launcher module 408 may be integrated within the OS 108.

In some existing solutions, the remote virtual desktop systems receive an indication (e.g., on-click pixel location) of a URI selection from a client device, and launches a virtual browser plugin or redirector application that posts an OS message to a dynamic virtual channel (DVC) module that then communicates a start instruction and the URI to the client device to cause the client device to launch a corresponding local client application associated with the URI. However, this prior process relies on browser, plugin, and/or redirector application functionality, which may not exist with some browsers, or may depend on particular protocols.

The embodiments presented herein do not rely on plugins or browser modifications and are also generalized to any application being executed, not being dependent on the use of URIs.

Figure 5:
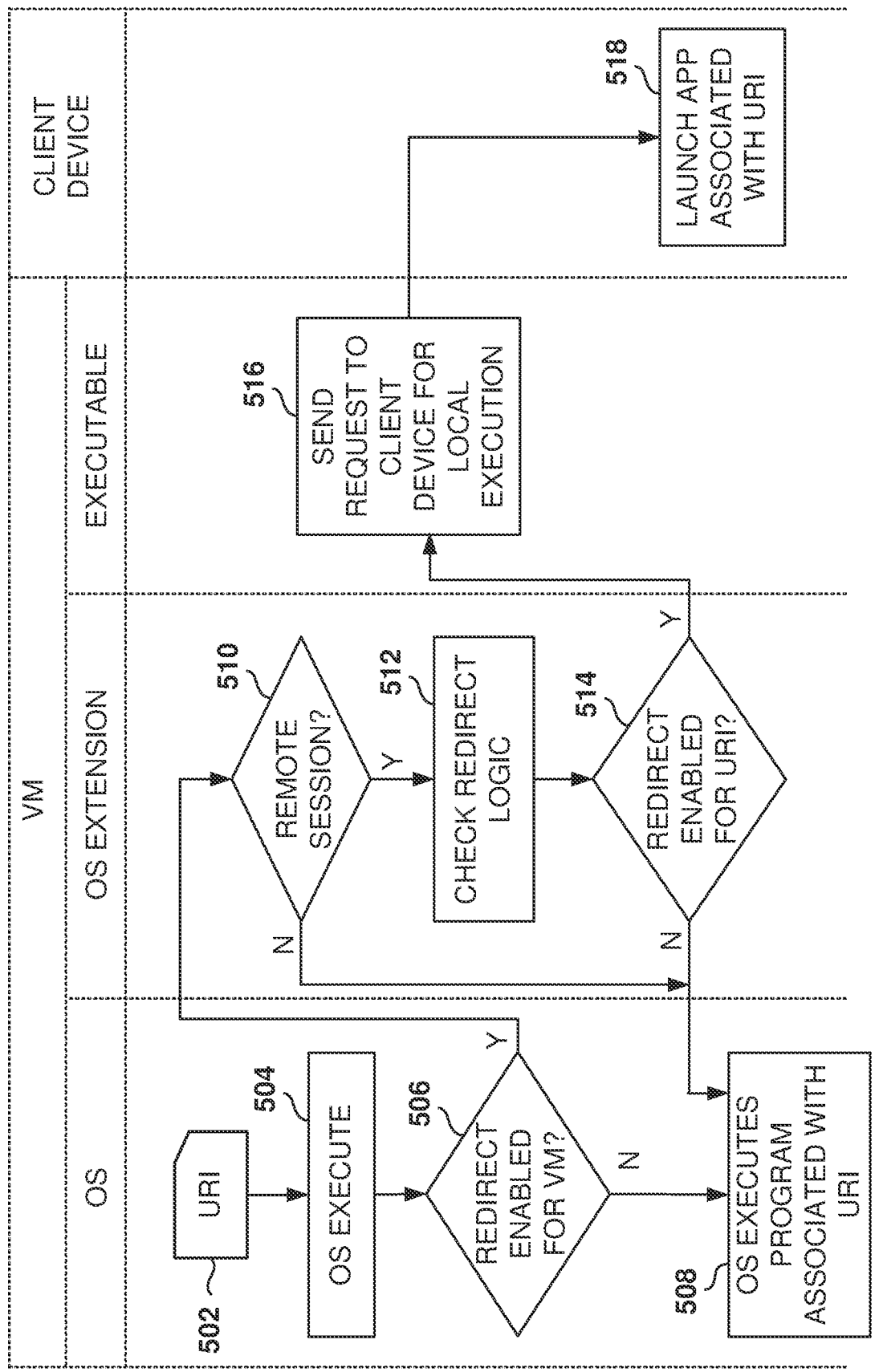
FIG. 5 is a flowchart of a method for redirecting program execution, according to some example embodiments.

FIG. 5 is a flowchart of a method for redirecting program execution, according to some example embodiments. The operations of the flow chart are divided in columns, where the three leftmost columns are for operations on the remote VM and the right column is for operations on the client device. Further, the left column is for the OS, the next column is for the OS extension, and the next column is for the executable module.

The OS extension is a module installed on the VM that expands the capabilities of the OS and is integrated with the OS. In some embodiments, the functions of the OS extension are performed by the OS itself, that is, the OS provides the functionality that the OS extension would provide as a separate module. The executable module is a program, or embedded within the OS, that interfaces with the OS on the local client device to launch programs on the local client device.

At operation 504, the OS execute module (e.g., operating system shell process) receives a URI 502 with information about a resource, such as a file to be opened, a website to be opened on a browser, or an application to be initiated. For example, the OS detects that a user has clicked on a desktop shortcut for a certain URL and the OS decides how that selection will be processed. It is noted that although embodiments are described with reference to an URI, the same principles may be applied to other actions that will activate execution of a program, such as trying to open a file on the VM.

At operation 506, the OS performs a check to determine if the redirection is enabled for the VM where the OS is executing. If redirection is enabled, the method flows to operation 510, and if redirection is not enabled, the method flows to operation 508. For example, the redirection is possible when the VM administrator has configured policies enabling redirection for this VM.

At operation 508, the URI is processed as it would be normally processed without redirection, that is, processed by the VM, and the OS on the VM executes the program associated with the URI 502.

At operation 510, a check is made by the OS extension to determine if this instance of the OS corresponds to a remote session (e.g., a VM). If the determination is that the OS is for a VM, the method flows to operation 512, and if the OS is not for a VM the method flows to operation 508 to execute program associated with the URI.

At operation 512, the URI is checked against the redirect logic to determine if this URI 502 should be redirected for execution to the client device. At operation 514, the redirect decision is checked. If the determination is that the URI will be redirected, the method flows to operation 516, and if the URI will not be redirected, the method flows to operation 508.

At operation 516, the executable module sends a request to the client device for local execution of the program associated with the URI. The request includes the URI and any other additional information required to execute the associated program, such as the location of the program, the desired web browser to open the URI, etc. In some embodiments, the request is sent to the app launcher module 408 illustrated in FIG. 4.

Once the client device receives the request for execution on the client device, at operation 518, the OS on the client device will launch the application associated with the URI.

It is noted that the embodiments illustrated in FIG. 5 are examples and do not describe every possible embodiment. Other embodiments may combine the operations of the OS, OS extension, and executable in a single module, or include additional modules, include other methods for activating the execution on the client device, etc. The embodiments illustrated in FIG. 5 should therefore not be interpreted to be exclusive or limiting, but rather illustrative.

Figure 6:
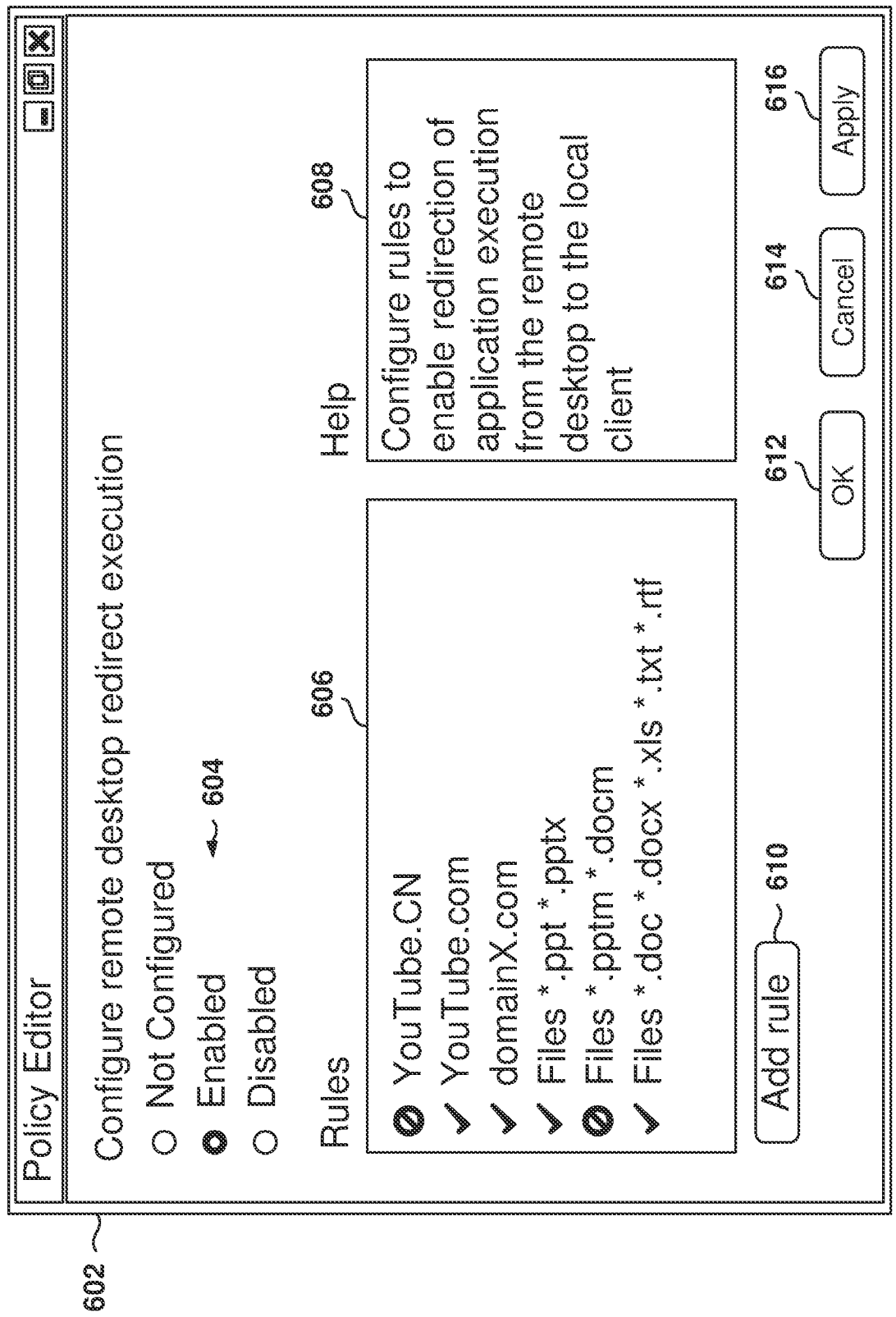
FIG. 6 is a user interface for configuring the redirect logic, according to some example embodiments.

FIG. 6 is a user interface 602 for configuring the redirect logic, according to some example embodiments. In some example embodiments, the UI is for a Microsoft Windows® system and is integrated within the group policy editor, and a new option is provided to configure VM redirection. Group Policy is a feature of the Microsoft Windows that controls the working environment of user accounts and computer accounts. Group Policy provides centralized management and configuration of operating systems, applications, and users' settings in an Active Directory environment. A set of Group Policy configurations is called a Group Policy Object (GPO).

The UI 602 includes options to configure the remote desktop redirect execution. Option 604 is fix selecting between not configured (initial default value), enabled, or disabled. When enabled, the redirection of programs for execution on the client device will take place. If disabled, there will be no redirection.

A rules window 606 presents the currently configured redirection rules. Selecting one of the configured rules allows the user to modify or delete the rule. Further, a button 610 allows the user to add a new redirection rule. A help window 608 provides helpful hints for the user, such as, "Configure rules to enable redirection of application execution from the remote desktop to the local client." Further, OK button 612 is selectable to confirm all changes and leave the UI 602, a cancel button 614 is selectable to cancel changes, and an apply button 616 is selectable to apply the current changes.

The redirection rules may be of different types. For example, redirection rules may include:
  rule to configure redirection based on a website address (e.g., URL);
  rule to configure redirection based on a file name (e.g., a specific program file);
  rule to configure redirection based on a file-name extension;
  rule to configure redirection for a phone number (e.g., tel:18008008888 to cause a phone application on the client device to call the phone number);
  rule to configure redirection based on a generic URI (e.g., all or part of the URI such as a domain name);
  rule to configure redirection based on the location where the file is located (e.g., a directory, a cloud storage location such as OneDrive, Google Drive);
  rule to configure redirection based on the computing resources available on the local client (e.g., enough memory available to execute the program on the client device),
  rule to configure redirection based on availability of a program on the client device (e.g., MS Office 365 has been installed on the client device);
  rule to configure redirection based on the amount of computing resources available on the cloud server (e.g., if the server is busy above a certain threshold of utilization, redirect execution to local clients when possible);
  rule to configure redirection based on a size of a file being open (e.g., open files larger than a predetermined threshold on the local client device and open the smaller files on the VM); etc.

Multiple rules may be combined to define the redirection policy. In the illustrated example, allowed websites or file extensions include a check-mark symbol next to the rule, and disallowed websites or file extensions include a "not-allowed" symbol next to the rule. An order may be defined on the rules indicating the order of execution of the rules.

In this example, the administrator as disallowed redirection of the website YouTube.CN and allowed redirection for Youtube.com. Additionally, if the IT policy has been set to not allow opening YouTuber.CN on VMs, then a request to open YouTube.CN will fail.

Further, opening any URL for the domain domainX.com has been allowed for redirection. Other rules allow redirection for certain files using a wildcard symbol "*". In this case, the rules allow files with extensions ppt, pptx, doe, docx, xls, txt, and rtf. However, the administrator has disallowed redirection for files with extensions pptm and docm, probably because these files may contain macros and pose a security risk.

Once the redirection rules are configured, in some embodiments, the rules are stored in the registry of Windows systems.

Being able to redirect program execution to the client device provides the following benefits:
  Improved performance due to redirection built directly into the Windows OS (other approaches use browser plugins or "redirector applications").
  Out-of-box support for all protocols. URIs, and web domains. Other solutions require additional multi-step actions from IT and/or end-users to procure and keep the plugins/redirector-apps up to date.
  Support for any client browser with no browser plugin required for web URIs.
  Improved app compatibility as the presented solution is universal for protocols and URIs irrespective of the browser or application. The administrator does not need to procure and install different plugins/redirector-apps per browser or app.
  The methodology works across all applications and does not require per-application coding, custom software, or use of a plugin.
  Easier to use by users and developers as the solution is embedded within the OS and works "out of the box."

It is noted that the embodiments illustrated in FIG. 6 are examples and do not describe every possible embodiment. Other embodiments may utilize different layouts, provide tools for entering rules, provide a set of predefined rules for user selection, etc. The embodiments illustrated in FIG. 6 should therefore not be interpreted to be exclusive or limiting, but rather illustrative.

Figure 7:
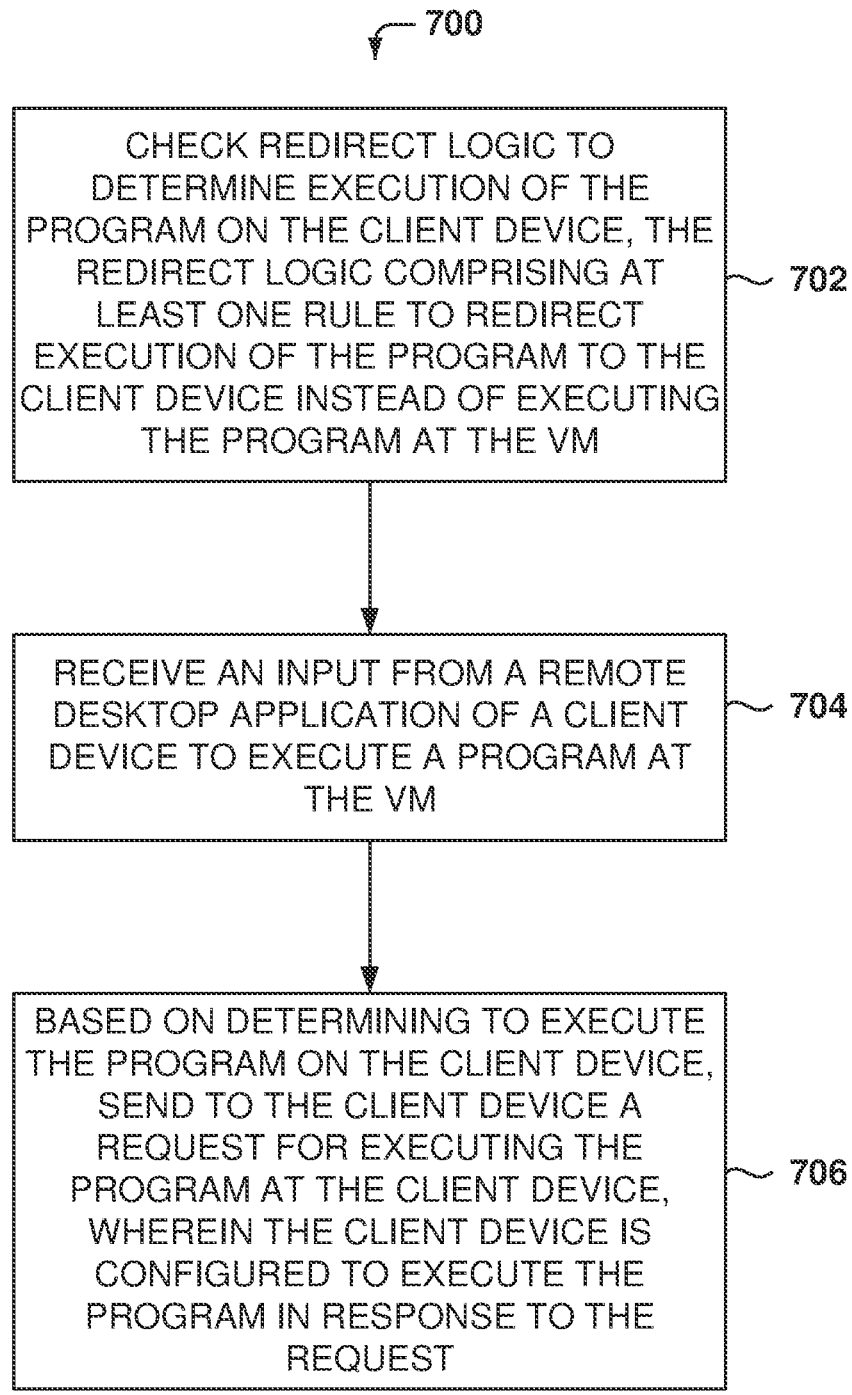
FIG. 7 is a flowchart of a method for redirecting executing of a program to a client device, according to some example embodiments.

FIG. 7 is a flowchart of a method 700, performed by a server executing a VM, for redirecting executing of a program to a client device, according to some example embodiments. While the various operations in this flowchart are presented and described sequentially, one of ordinary skill will appreciate that some or all of the operations may be executed in a different order, be combined or omitted, or be executed in parallel.

Operation 702 is for receiving an input from a remote desktop application of a client device to execute a program at the VM.

From operation 702, the method 700 flows to operation 704 for checking redirect logic to determine execution of the program on the client device. The redirect logic comprises at least one rule to redirect execution of the program to the client device instead of executing the program at the VM.

From operation 704, the method 700 flows to operation 706 for, based on determining to execute the program on the client device, sending to the client device a request for executing the program at the client device, wherein the client device is configured to execute the program in response to the request.

In one example, the input is for activating a Uniform Resource Identifier (URI).

In one example, the request for executing the program includes parameter values for executing the program at the client device.

In one example, the redirect logic comprises a rule to determine execution on the client device based on at least part of a Uniform Resource Locator (URL).

In one example, the redirect logic comprises a rule to determine execution on the client device based on a name of an executable file to be executed.

In one example, the redirect logic comprises a rule to determine execution on the client device based on a location of an executable file to be executed.

In one example, the redirect logic comprises a rule to determine execution on the client device when the program is installed in the client device.

In one example, the client device includes an application launcher configured to receive the request for executing the program and interface with an operating system (OS) at the client device to launch the program.

In one example, the client device executes the program causing presentation on the client device of a window separate from a window associated with the remote desktop application.

In one example, the client device executes the program causing presentation on the client device of a window stitched inside a window associated with the remote desktop application.

The execution redirection provides several benefits, such as reduce network utilization (e.g., by avoiding the transfer of large amount of data between the VM, and the local client device), free resources for the VM service provider, improve delivery of video on the display, etc. Additionally, the execution redirection is more efficient and broadly applicable than redirection with a remote virtual browser plugin or a remote virtual separate redirector application, which may not exist with some browsers, and may depend on particular protocols.

In view of the disclosure above, various examples are set forth below. It should be noted that one or more features of an example, taken in isolation or combination, should be considered within the disclosure of this application.

Another general aspect is for a server that includes a memory comprising instructions and one or more computer processors for executing a VM. The instructions, when executed by the one or more computer processors, cause the server to perform operations comprising: detecting an input at the VM to execute a program at the VM, the VM being accessed by a client device executing a remote desktop application for accessing the VM; checking redirect logic for executing the program, the redirect logic defining one or more rules for redirecting execution of the program to the client device; and sending, based on the checking, to the client device a request for executing the program at the client device instead of executing the program at the VM, wherein the client device is configured to execute the program in response to the request.

In yet another general aspect, a machine-readable storage medium (e.g., a non-transitory storage medium) includes instructions that, when executed by a machine, cause the machine to perform operations comprising: detecting, by a server executing a virtual machine (VM), an input at the VM to execute a program at the VM, the VM being accessed by a client device executing a remote desktop application for accessing the VM; checking, by the server, redirect logic for executing the program, the redirect logic defining one or more rules for redirecting execution of the program to the client device; and sending, by the server based on the checking, to the client device a request for executing the program at the client device instead of executing the program at the VM, wherein the client device is configured to execute the program in response to the request.

Figure 8:
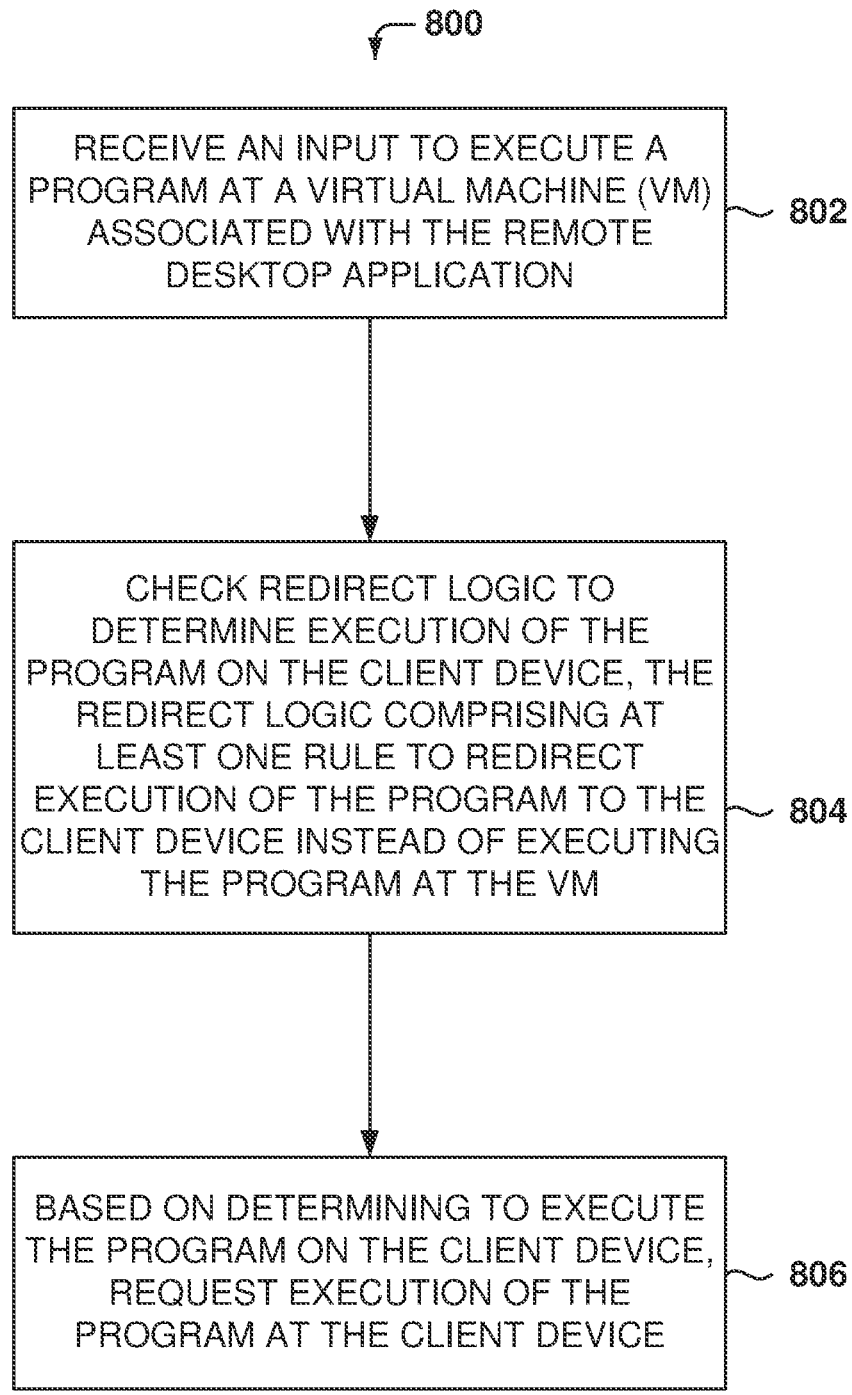
FIG. 8 is a flowchart of a method for redirecting executing of a program to a client device, according to some example embodiments.

FIG. 8 is a flowchart of a method 800 for redirecting executing of a program to a client device, according to some example embodiments. The method is performed by a remote desktop application executing on a client device.

Operation 802 is for receiving an input to execute a program at a VM associated with the remote desktop application.

From operation 802, the method 800 flows to operation 804 to check redirect logic to determine execution of the program on the client device. The redirect logic comprises at least one rule to redirect execution of the program to the client device instead of executing the program at the VM.

From operation 804, the method 800 flows to operation 806 where, based on determining to execute the program on the client device, the remote desktop requests execution of the program at the client device.

Figure 9:
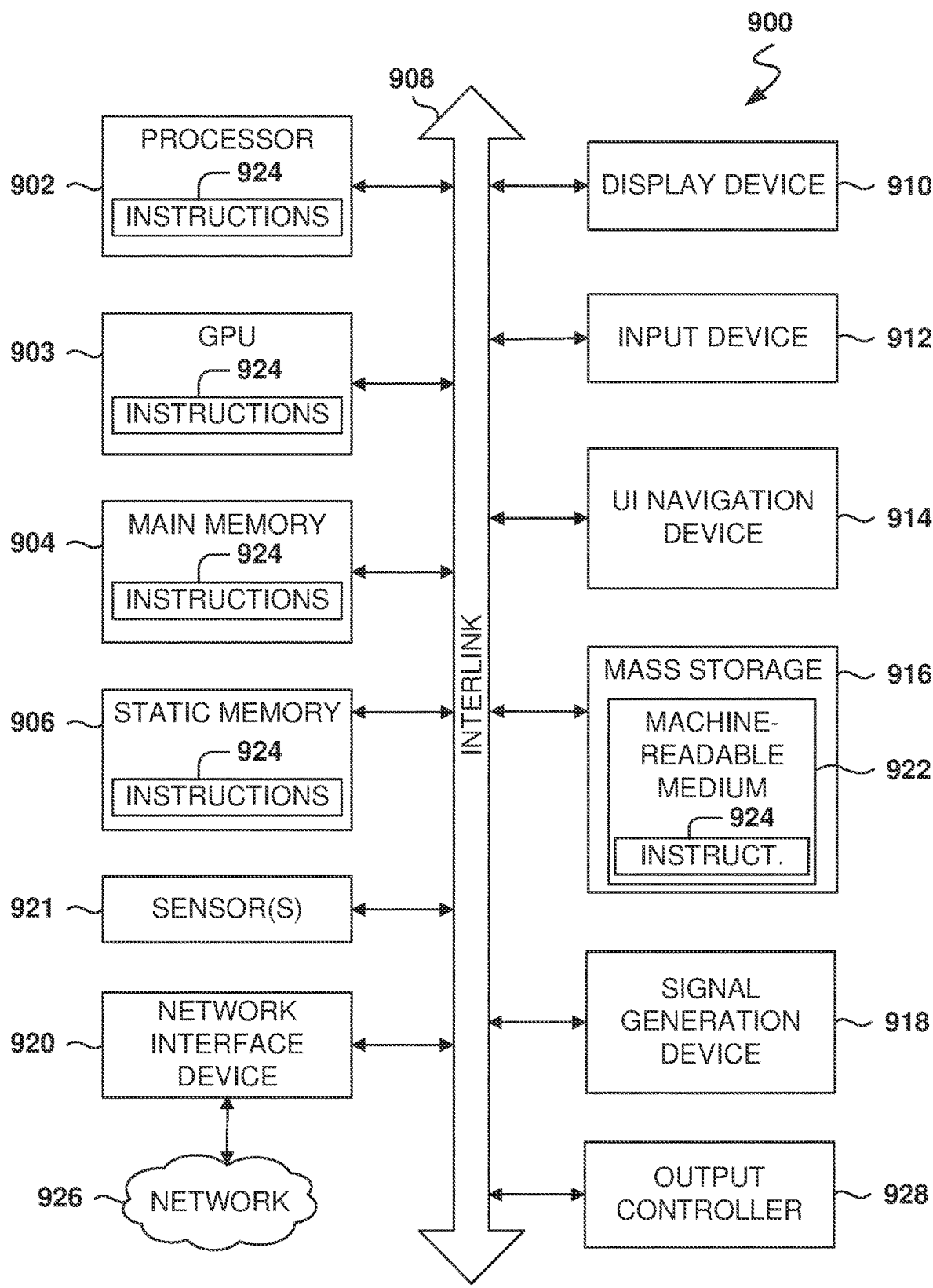
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a hardware processor core, or any combination thereof), a graphics processing unit (GPU) 903, a main memory 904, and a static memory 906, some or all of which may communicate with each other via an interlink (e.g., bus) 908. The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method performed by a server executing a virtual machine (VM), the method comprising:
   presenting, in a selection window of a user interface (UI), one or more redirection rules of a redirect logic that defines executing a program in a client device instead of executing the program at the VM;
   detecting a request in the UI to modify a first redirection rule of the one or more redirection rules;
   changing the first redirection rule in response to the request;
   updating the redirect logic based on the change to the first redirection rule;
   receiving an input from a remote desktop application of a client device to execute a program at the VM;
   checking the redirect logic to determine execution of the program on the client device by determining that a Uniform Resource Identifier (URI) of the program satisfies the redirect logic; and
   based on determining that the program satisfies the redirect logic, sending to the client device a request for executing the program at the client device, the request comprising the URI, wherein the client device is configured to execute the program in response to the request with the URI.

2. The computer-implemented method as recited in claim 1, wherein the request in the UI is for activating the Uniform Resource Identifier (URI).

3. The computer-implemented method as recited in claim 1, wherein the request for executing the program includes parameter values for executing the program at the client device.

4. The computer-implemented method as recited in claim 1, wherein the redirect logic comprises a second redirection rule to determine execution on the client device based on at least part of a Uniform Resource Locator (URL).

5. The computer-implemented method as recited in claim 1, wherein the redirect logic comprises a third redirection rule to determine execution on the client device based on a name of an executable file to be executed.

6. The computer-implemented method as recited in claim 1, wherein the redirect logic comprises a fourth redirection rule to determine execution on the client device based on a location where an executable file to be executed is stored.

7. The computer-implemented method as recited in claim 1, wherein the redirect logic comprises a fifth redirection rule to determine execution on the client device when the program is installed in the client device.

8. The computer-implemented method as recited in claim 1, wherein the client device includes an application launcher configured to receive the request for executing the program and interface with an operating system (OS) at the client device to launch the program.

9. The computer-implemented method as recited in claim 1, wherein the client device executes the program causing presentation on the client device of a window separate from a window associated with the remote desktop application.

10. The computer-implemented method as recited in claim 1, wherein the client device executes the program causing presentation on the client device of a window stitched inside a window associated with the remote desktop application.

11. A server comprising:
a memory comprising instructions; and
at least one computer processor for executing a virtual machine (VM), wherein the instructions, when executed by the at least one computer processor, cause the server to perform operations comprising:
presenting, in a selection window of a user interface (UI), one or more redirection rules of a redirect logic that defines executing a program in a client device instead of executing the program at the VM;
detecting a request in the UI to modify a first redirection rule of the one or more redirection rules;
changing the first redirection rule in response to the request;
updating the redirect logic based on the change to the first redirection rule;
receiving an input from a remote desktop application of a client device to execute a program at the VM;
checking the redirect logic to determine execution of the program on the client device by determining that a Uniform Resource Identifier (URI) of the program satisfies the redirect logic; and
based on determining that the program satisfies the redirect logic, sending to the client device a request for executing the program at the client device, the request comprising the URI, wherein the client device is configured to execute the program in response to the request with the URI.

12. The server as recited in claim 11, wherein the request in the UI is for activating the Uniform Resource Identifier (URI).

13. The server as recited in claim 11, wherein the request for executing the program includes parameter values for executing the program at the client device.

14. The server as recited in claim 11, wherein the redirect logic comprises a second redirection rule to determine execution on the client device based on at least part of a Uniform Resource Locator (URL).

15. The server as recited in claim 11, wherein the redirect logic comprises a third redirection rule to determine execution on the client device based on a name of an executable file to be executed.

16. A computer-implemented method performed by a server executing a virtual machine (VM), the method comprising:
presenting, in a selection window of a user interface (UI), one or more redirection rules of a redirect logic that defines executing a program in a client device instead of executing the program at the VM;
detecting a request in the UI to modify a first redirection rule of the one or more redirection rules;
changing the first redirection rule in response to the request;
updating the redirect logic based on the change to the first redirection rule;
receiving an input from a remote desktop application of a client device to execute a program at the VM;
checking the redirect logic to determine execution of the program on the client device by determining that a Uniform Resource Identifier (URI) of the program satisfies the redirect logic; and
based on determining that the program satisfies the redirect logic, sending to the client device a request for executing the program at the client device, the request comprising the URI, wherein the client device is configured to execute the program in response to the request with the URI.

17. The computer-implemented method as recited in claim 16, wherein the request in the UI is for activating the Uniform Resource Identifier (URI).

18. The computer-implemented method as recited in claim 16, wherein the request for executing the program includes parameter values for executing the program at the client device.

19. The computer-implemented method as recited in claim 16, wherein the redirect logic comprises a second redirection rule to determine execution on the client device based on at least part of a Uniform Resource Locator (URL).

20. The computer-implemented method as recited in claim 16, wherein the redirect logic comprises a third redirection rule to determine execution on the client device based on a name of an executable file to be executed.

* * * * *